United States Patent
Lindqvist et al.

(10) Patent No.: US 6,821,435 B1
(45) Date of Patent: Nov. 23, 2004

(54) WATER PURIFYING SYSTEM

(75) Inventors: Jan Lindqvist, Lingsvägen (SE); Jan-Olov Sparrman, Troiliusgatan (SE)

(73) Assignee: Josab International AB, Helsinborg (SE)

( * ) Notice: Subject to any disclaimer, the term of this patent is extended or adjusted under 35 U.S.C. 154(b) by 0 days.

(21) Appl. No.: 10/110,399

(22) PCT Filed: Oct. 9, 2000

(86) PCT No.: PCT/SE00/01948
§ 371 (c)(1),
(2), (4) Date: Aug. 20, 2002

(87) PCT Pub. No.: WO01/27035
PCT Pub. Date: Apr. 19, 2001

(30) Foreign Application Priority Data

Oct. 14, 1999 (SE) .............................................. 9903704

(51) Int. Cl.[7] .............................. C02F 1/28; C02F 1/32; C02F 9/12
(52) U.S. Cl. ...................... 210/668; 210/691; 210/748; 210/202; 210/259; 210/266; 210/275
(58) Field of Search ................................ 210/663, 668, 210/691, 748, 202, 259, 266, 275

(56) References Cited

U.S. PATENT DOCUMENTS

| | | | | |
|---|---|---|---|---|
| 5,900,211 A | * | 5/1999 | Dunn et al. | 422/24 |
| 5,935,431 A | | 8/1999 | Korin | 210/205 |
| 6,129,893 A | * | 10/2000 | Bolton et al. | 422/23 |
| 6,187,192 B1 | * | 2/2001 | Johnston et al. | 210/502.1 |
| 6,241,893 B1 | * | 6/2001 | Levy | 210/660 |

FOREIGN PATENT DOCUMENTS

| | | |
|---|---|---|
| DE | 384 0276 | 5/1990 |
| EP | 06 68243 | 8/1995 |
| JP | 11 226 565 | 8/1999 |

* cited by examiner

Primary Examiner—Ivars C. Cintins
(74) Attorney, Agent, or Firm—Lowe Hauptman Gilman & Berner, LLP

(57) ABSTRACT

The invention relates to a system for water purification comprising at least two units, of which the first unit comprises at least one filter unit (1) which consists of a container (2) containing a filter bed (3) of zeolite, and of which the second unit (4) consists of a container (5) enclosing a UV lamp (6). The two units are connected to each other by means of a conduit (7) for conveying water. According to the invention, the filter bed (3) consists of at least 50% by weight natural zeolite with a pore diameter of 0.05–5 nm. The pressure in the filter bed is 1–4 bar and the UV lamp (6) has a light intensity of 300–500 J/m$^2$.

26 Claims, 1 Drawing Sheet

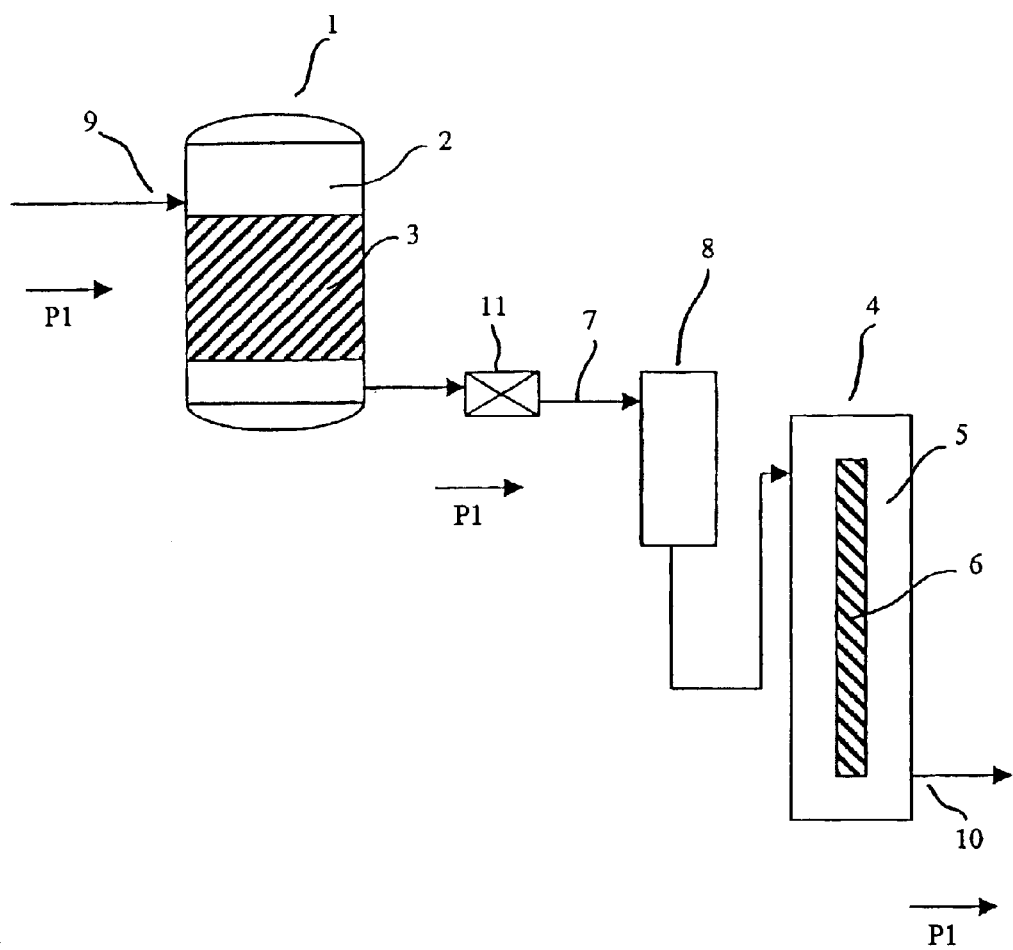

WATER PURIFYING SYSTEM

The present invention relates to a system and a method of purifying water. More particularly, the invention relates to a system and a method of purifying water of pathogenic micro-organisms such as Giardia and Cryptosporidium.

Polluted drinking water is a great problem and causes mild affections as well as serious diseases and even deaths. In the US, a number of serious outbreaks have been registered as a consequence of drinking water being polluted. Especially harmful effects are caused by the water-borne parasites Giardia and Cryptosporidium. A crucial problem with these organisms is that they cannot be efficiently eliminated from water by applying known methods. The organisms can be found in the whole world, but are most common in warm countries and they cause diarrhoea, stomach pain and nausea. The most serious outbreak of cryptosporidiosis in the US occurred in 1993 in Milwaukee in which 400,000 people were taken ill with polluted drinking water.

Normally, drinking water is purified in several steps such as by flocculation, sedimentation, filtration through sand and chlorination. However, micro-organisms have an incredible ability to adjust to different environments and they gradually become resistant to common bactericidal systems and disinfectants. Cryptosporidium is, for instance, resistant to chlorine and can resist 3% chlorine for 18 hours. However, the WHO recommend only 0.5 ppm chlorine in drinking water.

In U.S. Pat. No. 5,935,431, an integrated filtration and sterilisation apparatus is described. In the apparatus, inlet water is first filtered through a filter bed of, for instance, active carbon, adsorption resin, zeolite, reduction catalysts, paper, polymers, clay, metals, etc. The filter material in this apparatus serves to separate particulate, organic or inorganic compounds from inlet water. If an inorganic material, such as heavy metals or sulphites, is to be removed, the filter material is preferably an ion-exchange resin, a zeolite or a reduction catalyst. The permeate, i.e. the filtered inlet water, is then exposed to UV radiation and ozone treatment, said ozone treatment giving rise to bacterial killing.

Besides being resistant to chlorine, Cryptosporidium is also very resistant to UV radiation and ozone. 1 ppm ozone for 5 minutes results in only 90% killing. However, such high concentrations of ozone are not permitted; only 0.4 ppm is permitted in outlet water intended for drinking water.

U.S. Pat. No. 5,935,431 does not mention how many ppm ozone are added to the outlet water, but this method suffers from the drawback that in ozone treatment degradation products form from the killed bacteria. It is not advisable to directly use the water discharged from this apparatus as drinking water, on the one hand, owing to the degradation products formed and, on the other, owing to possibly remaining ozone.

Both Giardia and Cryptosporidium have a spore stage in their life cycles. The spores are much smaller than the actual organisms and the oocysts of Cryptosporidium can be as small as 4 $\mu$m. Today, only ultrafiltration or reverse osmosis can separate such small particles, but the methods are too expensive to be used for large volumes of water.

Thus there is a great need for a new system for purifying drinking water which is capable of dealing with Cryptosporidium, Giardia and other pathogenic, water-borne micro-organisms.

One object of the present invention is to provide a system and a method in which water containing Cryptosporidium and Giardia can be efficiently purified with excellent results.

Other objects, features and advantages of the present invention will be apparent from the description below.

These objects are achieved by a system and a method according to the independent claims. Particularly preferred embodiments are defined in the dependent claims.

In short, the present invention relates to a system for water purification comprising at least two units, of which the first unit comprises at least one filter unit which consists of a container containing a filter bed of zeolite, and of which the second unit consists of a container enclosing a UV lamp. The two units are connected to each other by means of a conduit for conveying water. According to the invention, the filter bed consists of at least 50% by weight natural zeolite with a pore diameter of 0.05–5 nm. The pressure in the filter bed is 1–4 bar and the UV lamp has a light intensity of 300–500 J/m$^2$.

It has, surprisingly, been found that excellent results are achieved when water containing Cryptosporidium and Giardia is purified in accordance with the method and the purifying system according to the present invention. Preliminary results show that a substantially complete reduction of Cryptosporidium and Giardia is obtained.

Preferred embodiments of the present invention will be described below, partly with reference to the accompanying drawing. The drawing must not be considered to limit the scope of the present invention.

The FIGURE is a schematic view of the system according to a preferred embodiment of the present invention.

Water purifying systems according to the present invention comprises at least two units. The first unit comprises at least one filter unit 1, which consists of a container 2 containing a filter bed 3 of zeolite. The second unit 4, the UV unit, consists of a container 5 enclosing a UV lamp 6. At the filter unit 1, the system is provided with an inlet 9 and at the UV unit 4 with an outlet 10. The two units are connected to each other by means of conduits 7 for conveying water, and the water moves through the purifying system in the direction shown by the arrows P1.

The filter bed 3 consists of at least 50% by weight natural zeolite, which preferably is clinoptilolite and/or mordenite. The zeolite has a pore diameter of 0.05–5 nm, preferably 0.08–3 nm and most preferably 0.1–1 nm. The grain size of the zeolite is 0.1–2.5 mm, preferably 0.6–2.0 mm.

The filter bed 3 has an inner filter surface of 50–600 m$^2$/g, preferably 200–500 m$^2$/g, and during operation the pressure in the filter bed is 1–4 bar, preferably 1.5–3.5 bar and most preferably 2.5–3.4 bar. The pressure is important for the zeolite to be compacted in the filter bed 3 and providing the desired purifying capacity. The pressure in the filter bed should be so high that particles larger than 1 $\mu$m get caught and stay in the filter. The pressure can be regulated by means of a water pump (not shown) for inlet water. A throttle valve 11 after the filter unit 1 makes it possible to quickly raise the pressure in the filter unit.

Besides the natural zeolite, the filter bed 3 can also contain montmorillonite, quartz, feldspar and vulcanised rock crystal.

The zeolite in the filter bed must have a certain hardness to be able to resist the pressure in the filter bed and should be able to resist a pressure of at least 2.5 bar, preferably at least 4 bar, and also be able to resist pressure fluctuations of up to 6 bar.

If several filter units are used, they can be connected either in parallel or in series.

The UV radiation takes place at a wave length of 200–280 nm, preferably 254 nm with a lamp 6 with a UV-C filter. The light intensity should preferably be 300–500 J/m$^2$, more preferably 350–450 J/m² and most preferably 400–430 J/m². UV light with a normal light intensity of about 250 J/m² does not provide the desired killing effect on the micro-organisms.

To ensure that the particle size is less than 1 μm at all points of time in the purification process, also after back flushing for cleaning the filter unit, a bag filter 8 can be placed between the filter unit 1 and the UV unit 4. The bag filter 8 is preferably made of polypropylene having a mesh size of less than 1 μm. As an alternative to the bag filter 8, it is possible (in a manner which is not shown in the FIGURE), after back flushing for cleaning the filter unit 1, to let water discharged from the filter unit return to the inlet 9 in the filter unit 1 until a sufficiently high pressure has been built up in the filter bed 3.

The present invention also relates to a method of purifying water, in particular of Cryptosporidium, in which the water is exposed to the above-described purifying system, for producing drinking water.

Even if the advantages of the invention have been described with reference to drinking water, the purifying system can, of course, be used for purifying other types of water, of which swimming-pool water is of particular interest.

When affording aid to emergency areas and countries devastated by war, it is important to have reliable, rapid, simple and cheap systems at hand for purifying water. One embodiment of the invention relates to a mobile purifying system for use in the field, which involves the above-described purifying system. In this case, the purifying system is mounted on a trailer and comprises a pump for pumping surface water, a sludge filter, filter units with a filter bed of zeolite, possibly a bag filter, a UV source, chlorinating equipment and a collection tank for the purified water.

What is claimed is:

1. A water purification system comprising at least two units, of which the first unit comprises at least one filter unit which includes a container containing a filter bed of zeolite, and of which the second unit includes a container enclosing a UV lamp, said two units being connected to each other by a conduit for conveying water, the filter bed having at least 50% by weight natural zeolite with a pore diameter of 0.05–5 nm, the pressure in the filter bed being 1–4 bar, and the UV lamp having a light intensity of 300–500 J/m², wherein a bag filter is arranged between the filter unit and the UV unit to ensure a particle size of less than 1 μm also after back flushing of the filter unit.

2. The system as claimed in claim 1, wherein the natural zeolite in the filter bed includes one of clinoptilolite and/or mordenite.

3. The system as claimed in claim 1, wherein the filter bed has an inner filter surface of 50–600 m²/g.

4. The system as claimed in claim 1, wherein the filter bed has an inner filter surface of 200–500 m²/g.

5. The system as claimed in claim 1, wherein the zeolite has a pore diameter of 0.08–3 nm.

6. The system as claimed in claim 1, wherein the zeolite has a pore diameter of 0.1–1 nm.

7. The system as claimed in claim 1, wherein the light intensity of the UV lamp is 350–450 J/m².

8. The system as claimed in claim 1, wherein the light intensity of the UV lamp is 400–430 J/m².

9. The system as claimed in claim 1, wherein the pressure in the filter unit is 1.5–3.5 bar.

10. The system as claimed in claim 1, wherein the pressure in the filter unit is 2.5–3.4 bar.

11. The system as claimed in claim 1, wherein the grain size of the zeolite is 0.1–2.5 mm.

12. The system as claimed in claim 1, wherein the grain size of the zeolite is 0.6–2.0 mm.

13. The system as claimed in claim 1, wherein the zeolite in the filter bed is able to resist a pressure of at least 2.5 bar.

14. A method of filtering water to eliminate Cryptosporidium, the method comprising:
passing water through a filter unit containing a filter bed of zeolite consisting of at least 50% natural zeolite with a pore diameter of 0.05–5 nm and a grain size of 0.1–2.5 mm, the pressure in the filter bed being 1–4 bar; and
radiating the water with UV-light having a light intensity of 300–500 J/m².

15. A water purification system comprising at least a first unit including at least one filter unit having a filter bed of zeolite, and a second unit having a UV lamp, said first and second units being connected together by a conduit adapted to convey water, the filter bed having at least 50% by weight natural zeolite with a pore diameter of 0.05–5 nm and a grain size of 0.1–2.5 mm, the pressure in the filter bed being 1–4 bar, and the UV lamp having a light intensity of 300–500 J/m².

16. The system as claimed in claim 15, wherein the natural zeolite includes one of clinoptilolite and/or mordenite.

17. The system as claimed in claim 15, wherein the filter bed has an inner filter surface of 50–600 m²/g.

18. The system as claimed in claim 15, wherein the filter bed has an inner filter surface of 200–500 m²/g.

19. The system as claimed in claim 15, wherein the zeolite has a pore diameter of 0.08–3 nm.

20. The system as claimed in claim 15, wherein the zeolite has a pore diameter of 0.1–1 nm.

21. The system as claimed in claim 15, wherein the light intensity of the UV lamp is 350–450 J/m².

22. The system as claimed in claim 15, wherein the light intensity of the UV lamp is 400–430 J/m².

23. The system as claimed in claim 15, wherein the pressure in the filter unit is 1.5–3.5 bar.

24. The system as claimed in claim 15, wherein the pressure in the filter unit is 2.5–3.4 bar.

25. The system as claimed in claim 15, wherein the grain size of the zeolite is 0.6–2.0 mm.

26. The system as claimed in claim 15, wherein the zeolite in the filter bed is arranged to resist a pressure of at least 2.5 bar.

* * * * *